Sept. 3, 1929.   R. MORRISON   1,726,710
WATER FEED REGULATOR
Filed Nov. 5, 1928

INVENTOR
RICHARD MORRISON
BY
Oscar J. DeWitt
ATTORNEY

Patented Sept. 3, 1929.

1,726,710

UNITED STATES PATENT OFFICE.

RICHARD MORRISON, OF GREAT BARRINGTON, MASSACHUSETTS.

WATER-FEED REGULATOR.

Application filed November 5, 1928. Serial No. 317,446.

The invention relates broadly to a water feed regulator for paper making, and more particularly to a device to regulate the amount of water to be used in preparing the paper stock so that when it passes from the screen to the head box and then onto the wire, the paper will be of the desired consistency.

Another object of my invention is to provide a water feed regulator of the character mentioned that may be set to cause any desired amount of water to mix with the paper stock, and when once regulated and set, to do away with the constant attendance of a machine tender to look after the flow of water.

With these and other objects in view, the invention resides in the features of construction, arrangement of parts and combination of elements which will hereinafter be fully described, reference being had to the accompanying drawings, in which:—

Figure 1:
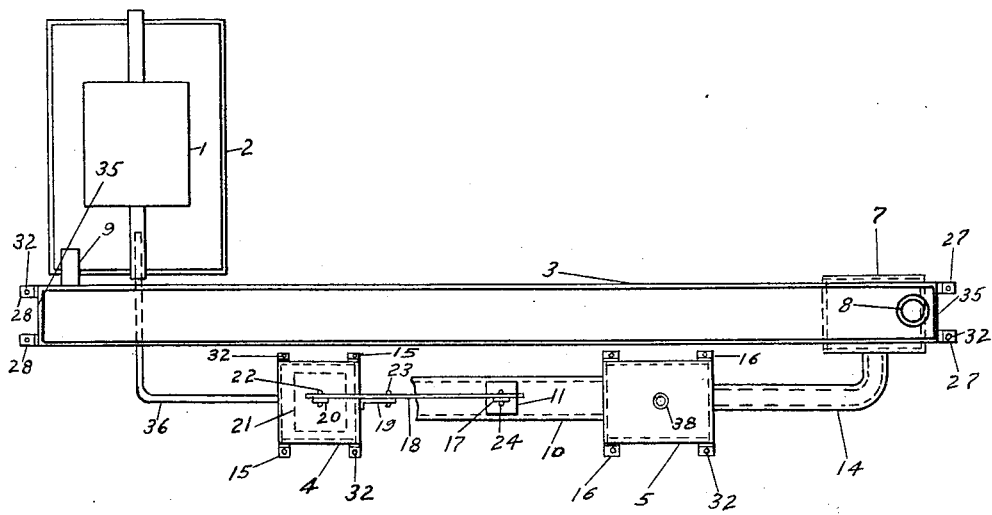
Figure 1 is a plan view.
Figure 2:
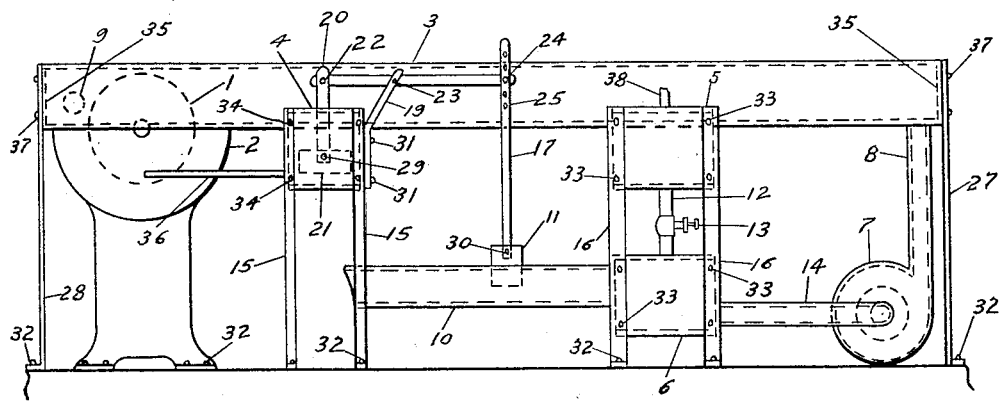
Figure 2 is a side elevation view.

Referring to the drawings, 2 indicates a vat into which the paper stock is admitted, in which there is a revolving hollow cylinder 1 covered with a wire screen. The paper stock in the vat is mixed with a certain quantity of water, and by means of the revolving cylinder 1 is thoroughly mixed to the desired consistency, and is carried from the vat onto a screen, which means is not shown on the drawing.

The vat 2 is secured in position by means of the bolts 32, and a vat pipe 36 leads into a float box 4. The float box 4 is mounted on supporting members 15 secured in position by means of the bolts 32, and the float box 4 is fastened to the supporting members 15 by means of the bolts or rivets 34.

The interior of the float box is provided with a float 21 that is connected to a float rod 20. A lever 18 is pivotally connected to the float rod 20 by a pin 22, to the fulcrum 19 by a pin 23, and to the save all valve lever 17 by means of a pin 24. The lever 17 may be adjusted on the save all float lever 18 by means of the hole 25 in the said lever. The fulcrum 19 is secured to the float box 4 by rivets 31 or other means.

As the paper stock passes from the screen or cylinder 1 to the head box and then over the wire the water is shaken out and what water is left the suction boxes and suction rolls take out and it is returned to the water box 6 thru the save all pipe 10. The save all pipe 10 is provided with a valve 11 secured to the save all valve lever 17, and this valve is regulated by means of the float 21. The save all pipe 10 terminates in the water box 6, and the water box 6 is mounted on the supporting members 16, and secured in position by means of the bolts or rivets 33. The valve 11 within the save all pipe 10 is regulated by means of the float 21 to carry the proper amount of water from the wire and suction rolls thru the save all pipe into the water box 6, which amount of water passing thru the save all pipe depends on the texture of the paper passing over the wire.

A water supply box 5 is mounted on the supporting members 16, above the water box 6, and secured in position by means of the rivets 33. The water supply box 5 is provided with a water supply pipe 38 on the top, and a pipe 12 provided with a valve 13 connects the water supply box 5 with the water box 6.

A pipe 14 extends from the water box 6 and terminates in the water pump 7, and a pipe 8 extends from the water pump 7 and connects with the overhead supply pipe 3, and a supply pipe 9 depends from the overhead supply pipe 3 into the vat 2. Standards 27 and 28 secured in position by means of the bolts 32, support the overhead supply pipe 3 by means of the bolts or rivets 37 fastened to the heads 35.

The operation of the device is as follows: The vat 2 is filled with water to a desired amount, and the water runs thru the vat pipe 36 into the float box 4, and the float 21 is regulated by the amount of water in the vat 2. The float in turn operates the valve 11 in the save all pipe 10 by means of the lever 18 and the save all valve rod 17.

During this operation the valve 13 is closed. The paper stock in the meantime is taken from the "stuff chests" and comes to the machine in either a thick or thin condition, and after the machine is started the valve 13 is opened and a certain amount of water allowed to enter the water box 6, and this water from the water box 6, and the water from the save all pipe 10 passes thru the pipe 14 into the pump 7 and is carried by means of the pipe 8 and the overhead supply pipe 3 and the depending pipe 9 back into the vat 2, and thus a certain amount of water is continually in circulation, and the desired amount to be used may be regulated by the valve 13. The pump 7 is an ordinary water pump, and the means of operation is not shown in the drawing.

What I claim is:—

1. The combination of a vat pipe, a float, a valve, a save all pipe, a water supply box, a water box, a pipe leading from the water box to a pump, a pipe leading from the pump to an overhead supply pipe, an overhead supply pipe with a depending pipe terminating into the vat.

2. The combination of a vat pipe terminating into a float box, a float box, a float slidably workable within the float box, means to connect the said float to a valve operable within a save all pipe, a save all pipe connected to a water box, a water supply box superimposed on the water box, means to regulate the supply of water from the water supply box into the water box, a pipe leading from the water box to a pump, a pipe leading from the pump to an overhead supply pipe, an overhead supply pipe with a depending pipe terminating into the vat.

3. The combination of a water feed regulator comprising a vat pipe terminating into a float box, a float slidably operable within the float box and connected to a valve in a save all pipe and adapted to regulate said valve, a save all pipe connected to a water box, a water supply box superimposed on the water box with means to regulate the flow of water from the water supply box into the water box, a pipe leading from the water box to a pump, said pump to provide the means to carry the water from the water box thru an overhead supply pipe into a pipe depending therefrom into the vat.

4. The combination of a water feed regulator comprising a float operated within a float box and controlled from a vat pipe, said float connected to and adapted to operate a valve within a save all pipe, said save all pipe connected to a water box with a water supply box superimposed thereon with means to regulate the flow of water from the water supply box into the water box, a pipe extending from the water box and connected to a pump, said pump to provide the means to cause the water from the save all pipe and water box to flow thru an overhead supply pipe into a pipe depending therefrom into a vat.

5. The combination of a water feed regulator comprising a float operated from a vat, a valve connected to said float and controlled by said float, said valve operable within a save all pipe to regulate the flow of water therein, said save all pipe connected to a water box, a water supply box superimposed on the water box with means to regulate the flow of water from the water supply box to the water box, means to connect the water box to an overhead supply pipe with a pipe depending therefrom and cause a continuous amount of water to be supplied to the vat.

In testimony whereof I affix my signature.

RICHARD MORRISON.